(12) United States Patent
Farina (10) Patent No.: US 8,322,399 B2
(45) Date of Patent: Dec. 4, 2012

(54) CONTINUOUS CASTING MACHINE FOR FORMING A LEAD ALLOY STRIP OF LARGE THICKNESS

(75) Inventor: Pietro Farina, Villafranca (IT)

(73) Assignee: Sovema S.p.A., Villafranca (VR) (IT)

( * ) Notice: Subject to any disclaimer, the term of this patent is extended or adjusted under 35 U.S.C. 154(b) by 5 days.

(21) Appl. No.: 12/804,959

(22) Filed: Aug. 3, 2010

(65) Prior Publication Data

US 2011/0030914 A1    Feb. 10, 2011

(30) Foreign Application Priority Data

Aug. 7, 2009   (IT) .............................. PD2009A0237

(51) Int. Cl.
*B22D 11/06* (2006.01)
(52) U.S. Cl. ....... 164/459; 164/47; 164/479; 164/449.1; 164/154.7; 164/415; 164/263; 164/418; 164/447
(58) Field of Classification Search .................. 164/459, 164/47, 479, 449.1, 154.7, 415, 263, 418, 164/447
See application file for complete search history.

(56) References Cited

U.S. PATENT DOCUMENTS

| | | | |
|---|---|---|---|
| 2,770,022 A | 11/1956 | Brennan | |
| 2,931,082 A * | 4/1960 | Brennan et al. | 164/461 |
| 3,346,036 A * | 10/1967 | Tarmann | 164/464 |
| 3,455,371 A * | 7/1969 | Gardner et al. | 164/482 |
| 3,659,643 A | 5/1972 | Pauels | |
| 3,968,459 A * | 7/1976 | Jacobson | 333/141 |

(Continued)

FOREIGN PATENT DOCUMENTS

| | | | |
|---|---|---|---|
| DE | 2 132 757 | | 1/1972 |
| JP | 11294964 A | * | 10/1999 |
| KR | 2003028864 A | * | 4/2003 |

OTHER PUBLICATIONS

English computer translation of JP 11294964 A.*

(Continued)

*Primary Examiner* — Erin Saad
(74) *Attorney, Agent, or Firm* — Browdy and Neimark, PLLC (57) ABSTRACT

Continuous casting machine for forming a lead alloy strip of large thickness; which comprises a cooled rotating drum (4) having an annular seat (8) formed on the periphery thereof and a vat (10) for containing a molten lead bath, which is sealingly engaged on the peripheral surface (7) of the rotating drum (4). The machine (1) also comprises a fixed shoe (11) extending, from the vat (10), along an arc (25) around the rotating drum (4) and having an arc shape suitable for sealing engagement, in a sliding relationship, on the shoulders (90) of the annular seat (8). Heating means (26) are provided, these consisting of a plurality of torches acting on the shoe (11) along at least an initial section thereof (25) which extends from the vat (10), for heating to a temperature higher than the melting temperature of the lead alloy the free surface of the lead inside the annular seat (8). The bottom (9) of the annular seat (8) is knurled, while the inner surface (13) of the shoe (11) which slides on the lead is smooth and kept at a high temperature by the heating means (26). As a result of these characteristic features, the rotating drum (4) is able to transport in a rotationally integral manner the lead from a first angular position where it is inserted in the molten state inside the annular seat of the rotating drum (8) to a following angular position where it is extracted in the form of a continuous strip.

14 Claims, 5 Drawing Sheets

U.S. PATENT DOCUMENTS

| | | | |
|---|---|---|---|
| 4,498,519 A | | 2/1985 | Watanabe et al. |
| 4,544,014 A | | 10/1985 | McLane et al. |
| 5,462,109 A | | 10/1995 | Vincze et al. |
| 5,547,013 A | * | 8/1996 | Sherwood .................... 164/416 |
| 5,948,566 A | | 9/1999 | Larsen et al. |

OTHER PUBLICATIONS

English computer translation of KR 2003028864 A.*

Italian Search Report for IT PD2009A000237 dated May 26, 2010.

* cited by examiner

CONTINUOUS CASTING MACHINE FOR FORMING A LEAD ALLOY STRIP OF LARGE THICKNESS

CROSS REFERENCE TO RELATED APPLICATIONS

Applicant claims priority under 35 U.S.C. §119 of Italian Patent Application No. PD2009A000237 filed on Aug. 7, 2009.

FIELD OF APPLICATION

The present invention relates to a continuous casting machine for forming a lead alloy strip of large thickness.

The machine in question is intended to be used in industrial processes for the production of electric batteries for forming a lead alloy strip of large thickness; this strip is then used in conventional rolling processes for subsequent stamping, incision or expansion operations in order to form the individual grids intended to be used with positive polarity or negative polarity in the batteries.

BACKGROUND ART

In the industrial sector relating to the production of electric batteries there exists a particularly pressing need to obtain, by means of low-cost processes, continuous high-quality lead strips which are then used for manufacturing, by means of conventional stamping or expansion or incision forming processes, the positive and negative grids for batteries.

These grids must have a crystal microstructure which is homogeneous as far as possible, advantageously of the globular or fine-grain type, suitable for ensuring optimum mechanical properties and a high corrosion resistance.

As is known, the abovementioned properties are obtained in an optimum manner by means of rolling of a lead strip with a large thickness, typically 8-18 mm, down to a thickness of about 1 mm.

During the rolling stage the lead alloy in the strip undergoes processes which aim to convert the polycrystalline and relatively non-homogeneous starting structure into crystal structures which have the abovementioned optimum mechanical and corrosion-resistant properties, these processes including, for example, those of homogenization, compaction, fine-grain recrystallization, density increase, grain size reduction and increase of the number of grains.

The present invention therefore relates specifically to the industrial sector for the production of strips with a large thickness, this term being understood as meaning a thickness in the range of 12-18 mm, intended to be subsequently rolled in order to obtain grids with optimum mechanical and corrosion-resistance properties.

It is known, for example, from the U.S. Pat. No. 4,498,519 to use a so-called "twin roll casting" machine for the production of a continuous lead strip, which has a crucible containing a molten lead bath, and two counter-rotating rolls which define between them a slit for communication with the bottom of the crucible, through which the flow of molten lead is intended to pass in order to form the continuous lead strip. In greater detail, the molten lead solidifies when it makes contact with the outer walls of the two rolls, which are suitably kept at a controlled temperature, forming at the outlet of the rollers a continuous strip of the desired thickness.

The main drawback of this machine consists in its high constructional complexity. It in fact requires a complex system of seals, formed with heated shoulders able to contain the molten lead crucible. Moreover, the temperature of the rolls must be regulated in an extremely precise manner in order to allow the strip to leave the rolls completely solidified without, however, an excessive cooling causing occlusion of the through-slit between the rolls or an excessive power consumption for rotation thereof.

Also known is a machine for the continuous production of a lead strip for manufacturing grids for electric batteries, which comprises a rotating drum with an annular cavity for forming the strip. The cavity is closed along an arc of the drum by a flexible steel strip which rotates on the transmission pulleys, forming a seal on top of the side shoulders of the drum. A supply vat for introducing a continuous flow of lead into the annular cavity of the drum is provided between the roll and the strip. The molten lead solidifies along the arc section which it passes over inside the cavity between the drum and the steel strip, emerging tangentially in the form of a continuous strip.

The main drawback of this machine of the known type consists in the limited width of the lead strips which it is able to produce. In fact, the metal strip closing the annular cavity of the drum is subject to deformation in the event of an excessive increase in the width of the cavity and therefore the strip which is to be produced, for example, typically beyond 120 mm. Moreover, an excessive rigidity of the metal strip results in considerable difficulties for rotation thereof on the transmission rolls.

Also known, for example from the U.S. Pat. No. 5,462,109 and U.S. Pat. No. 5,948,566, is a continuous casting machine for forming a lead alloy strip, which comprises a rotating drum with an annular cavity for forming the strip. The cavity is closed along an arc of the drum by a shoe which is arranged on one side of the drum and provided internally with a chamber containing lead in the molten state communicating with the annular cavity. During operation, the rotating drum removes the molten lead from the chamber and cools it along a circumferential arc of about 90° and then releases it tangentially substantially from the top of the drum.

Preferably, cooling rolls are provided for ensuring that the edges of the lead alloy strip are completely solidified before extraction of the strip. The cooling rolls compress for this purpose the strip along the edges against the peripheral wall of the drum. The wall is suitably treated in order to facilitate the formation of lead nucleation points during solidification thereof.

The machines described in the aforementioned U.S. Pat. No. 5,462,109 and U.S. Pat. No. 5,948,566 are intended for the production of strips of very limited thickness, typically of the order of a millimeter, and do not allow the production of strips which have a thickness greater than two millimetres nor those with a large thickness. They are in fact able to transport integrally with the roll only that small layer of lead which solidifies upon contact with the surface of the roll when the latter enters into the molten lead crucible.

Consequently, these machines are entirely unsuitable for the production of strips which are to be rolled with a high rolling ratio for the formation of lead grids with a high grain refinement of the alloy or with optimum mechanical and corrosion-resistance properties.

Finally, a drawback which is common to all the continuous casting machines of the known type described above consists in the fact that the lead does not solidify with a homogeneous crystal and fine-grain structure suitable for ensuring optimum mechanical and corrosion resistance properties. Usually, for the lead, a crystal structure of the globular type, substantially devoid of dendritic formations and with uniformly distributed grains and average dimensions of less than 50 μm, is considered to be optimal.

For example, in order to increase the number of nuclei present in the molten lead bath, the machines described in the U.S. Pat. No. 5,462,109 and U.S. Pat. No. 5,948,566 envisage pitting the outer cooling surfaces of the drums with glass dust, without however this treatment producing satisfactory results.

In view of the speed of production of the continuous strip, the chemical refining techniques, which envisage adding to the lead alloy particles of other already solid components, called inoculating or refining agents (such as copper, selenium and tin), which act as active nuclei in the liquid metal, have proved to be equally unsatisfactory.

Also known in the same industrial sector for the production of electric batteries are machines which are able to form directly a continuous strip of grids from a continuous casting of molten lead.

A known machine of this type is described for example in the U.S. Pat. No. 4,544,014 and envisages continuously casting a molten lead alloy on a rotating drum having formed on the outer peripheral surface a plurality of grooves distributed in accordance with the design of the battery grid which is to be produced. In greater detail, the molten lead alloy is distributed in the grooves of the drum by means of an opening formed in a shoe mounted fixed on the machine and sealingly tightened against the surface of the drum parallel to the axis of rotation of the latter.

The drum is kept at a controlled temperature so as to allow solidification of the lead filaments inside the grooves.

The molten lead remains trapped inside the grooves closed at the top by the shoe and is therefore easily transported by the drum during its rotation.

This machine cannot be modified replacing the grooves with an annular seat in order to form a continuous lead strip, since the problem of transporting the lead arranged inside the seat integrally with the drum would still remain entirely unsolved.

DISCLOSURE OF THE INVENTION

In this situation, the problem underlying the present invention is therefore that of overcoming the drawbacks arising in the machines of the known type by providing a continuous casting machine for forming a lead alloy strip of large thickness and consequently suitable for rolling, which can be produced at a low cost while having a high production output.

A further object of the present invention is to provide a machine which is able to produce large-thickness lead alloy strips by controlling in a simple and efficient manner the solidification temperature of the lead until the moment of its extraction in the form of a continuous strip.

A further object of the present invention is to provide a machine which is able to convey in an efficient manner the large-thickness molten lead alloy on the outer surface of a rotating drum intended to perform cooling and solidification thereof.

A further object of the present invention is to provide a machine which is able to produce lead alloy strips with crystallized grains in uniformly distributed and globular type formations.

A further object of the present invention is to provide a machine which is constructionally simple and operationally entirely reliable.

These objects, together with others, are all achieved by the continuous casting machine for forming a lead alloy strip of large thickness according to the present invention.

Owing to this machine it is possible to produce at a low cost and with a high production output a continuous lead alloy strip which has optimum mechanical and chemical properties.

The machine according to the invention is at the same time constructionally simple and operationally entirely reliable.

BRIEF DESCRIPTION OF THE DRAWINGS

The technical features of the invention, in accordance with the above-mentioned objects, may be clearly determined from the contents of the claims provided below and the advantages thereof will emerge more clearly from the detailed description which follows, with reference to the accompanying drawings which illustrate a purely exemplary and non-limiting embodiment thereof, where:

DETAILED DESCRIPTION OF A PREFERRED EXAMPLE OF EMBODIMENT

With reference to the drawings 1 denotes in its entirety the continuous casting machine for forming a lead alloy strip of large thickness according to the present invention.

The lead strip produced by this machine is advantageously intended to be used in conventional processes for forming lead grids to be used with positive polarity or negative polarity in batteries.

These processes envisage the use of a large-thickness strip, rolling thereof down to the desired thickness and then, for example, stamping or alternatively incision and expansion thereof in order to form the individual grids.

Below, in order to simplify illustration, reference shall be made generally to a strip intended to be used in rolling processes for forming grids for electric batteries, and therefore typically with a thickness of 8-18 mm and width of 100-350 mm, described generally as being made of lead, although the material forming the strip may consist of any lead alloy suitable for use in the production of electric battery grids.

In particular, the term "strip of large thickness" shall be understood as meaning a strip with a thickness in the range of 8-18 mm.

With particular reference to the accompanying figures, the machine has a support structure 2 which rests on the ground and on which a shaft 3 with a rotating drum 4 concentrically fixed thereto is rotatably mounted.

The support structure 2 is provided with a plurality of bars 20 which extend radially towards the axis of the shaft 3 so as to be connected at one end, centrally with respect to the rotating drum 4, to two support bodies 2. The latter are arranged on the two sides of the rotating drum 4 and have, coaxially mounted thereon, the bearings for rotatably supporting the shaft 3 of the rotating drum 4 about a horizontal axis of rotation Y.

The shaft 3 is rotated about the aforementioned horizontal axis of rotation Y by motorized driving means 5, for example consisting of a motor and a reduction unit directly connected to the shaft 3 of the rotating drum 4.

The reduction unit is rigidly fixed to the support structure of the machine 1 by means of a flange 21 supported by bars 22 which extend horizontally from the aforementioned radial bars 20.

Figure 6:
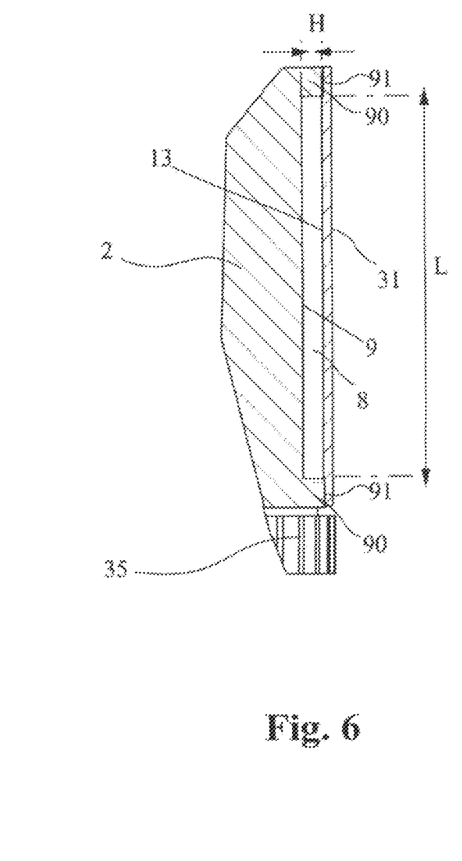
FIG. 6 shows an enlarged detail relating to an annular seat for containing the molten lead alloy in a cross-sectional view along the line VI-VI of FIG. 1.

The rotating drum 4 has an outer peripheral surface 7 having, formed therein, an annular seat 8 with width L and depth H respectively equal to the width and the thickness of the lead strip which is to be produced.

The aforementioned seat 8 is defined on the outer peripheral surface 7 of the rotating drum 4 by means of a bottom surface 9 and two side shoulders 90.

The machine 1 also comprises a vat 10 for containing a molten lead bath, which is sealingly engaged on the peripheral surface 7 of the rotating drum 4 so as to introduce, through at least one opening, the molten lead into the annular seat 8, filling the latter continuously during rotation of the said rotating drum 4.

The vat 10 is connected to supply means so as to be replenished with molten lead, said supply means consisting, for example, of a lead crucible accessed by a pump which, via a delivery line 110, supplies the vat 10 with the amount of molten lead needed to fill the annular seat 8 during rotation of the rotating drum 4.

The supply means are shown in the accompanying figures in the form of the delivery pipe 110 alone and are not shown in greater detail since they are well known to a person skilled in the art.

The vat 10 is arranged in a first angular position 200 around the rotating drum 4, advantageously situated slightly beyond the top end 201 of the said rotating drum 4, relative to the direction of rotation of the latter indicated by an arrow F in the accompanying drawings.

The level of molten lead inside the vat 10 is kept by the supply means 110 preferably at a height higher than the height at which the annular seat 8 enters into the said vat 10.

Cooling means 23 are envisaged, said means acting on the rotating drum 4 so as to keep it at a temperature lower than the melting temperature of the lead alloy and preferably at a temperature within the range of 60° to 90°. In this way, the rotating drum 4 cools the lead which is cast inside the annular seat 8 in the first angular position 200 of the vat 10, causing it to solidify before it reaches a second angular position 203 around the rotating drum 4, where it is extracted from the annular seat 8 in the form of solidified continuous lead strip.

These cooling means 23 may, for example, comprise a closed cooling circuit inside which a cooling fluid is circulated by means of a pump, said cooling fluid advantageously consisting of water which is conveyed via a delivery line to the internal chamber closed by the rotating drum 4 and removed from the same internal chamber via a return line. Preferably, this circuit envisages conveying the fluid into the drum 7 and removing it from the drum by means of the shaft 3 which is specially provided with two coaxial pipes, the innermost one of which, for example, has an inlet opening 24, connected to the cooling circuit in order to supply the rotating drum 4 with the cooling water, and the outermost one of which has an outlet opening 25, connected to the cooling circuit in order to extract the cooling water from the rotating drum 4.

According to the underlying idea of the present invention, the machine 1 comprises a fixed shoe 11 which is rigidly connected to the support structure 2, in particular by means of a support frame 12, and extends, from the vat 10, along an arc 42 around the rotating drum 4. The shoe 11 has an inner surface 13 directed towards the arc-shaped rotating drum 4 with a concave curvature corresponding to the convex curvature of the outer surface 7 of the rotating drum 4 and sealingly engaged, in a sliding relationship, on the shoulders 90 of the annular seat 8. According to the invention the machine 1 is also provided with heating means 26 acting on the shoe 11, along at least an initial section 27 thereof, which extends from the vat 10, said means heating, to a temperature higher than the melting temperature of the lead alloy, the free surface of the lead inside the annular seat 8 so as to allow it to flow with low friction on the inner surface of the shoe 11.

For example, in accordance with the example of embodiment shown in the accompanying figures, the heating means 26 extend along an initial section 27 equivalent to about 90° and preferably greater than half the extension of the arc 42 of the shoe 11. The temperature of the latter must be kept substantially constant along the entire initial section 27 so as to ensure that the surface layer of the lead remains in the liquid state and thereby flows with an extremely small amount of friction over the inner surface 13 of the shoe 11.

The shoe 11 is formed preferably as a metal plate 11 with its inner surface 13 directed towards the arc-shaped drum 4 and preferably smooth so as to favour flowing of the lead contained inside the annular seat 8 on the free surface.

The aforementioned metal plate 11 is engaged, in a sliding relationship, with the upper surface 91 of the two side shoulders 90 of the rotating drum 4.

The lead therefore remains confined along the entire length of the metal plate 11 between the annular seat 8 of the rotating drum 4 and the inner surface 13 of the metal plate 11.

In order to ensure sealing of the metal plate 11 on the side shoulders 90 of the rotating drum, and therefore prevent molten lead escaping from the annular seat 8, several adjusting screws 14 are provided, said screws being engaged with the support frame 12 of the shoe 11 and acting on the latter so as to adjust its sealing tightness against the rotating drum 7.

In greater detail, in accordance with one possible embodiment, the support frame 12 of the shoe 11 comprises two arc-shaped lateral flanges formed by means of calendering, fixed to the support structure 2 of the machine 1 and provided at regular angular intervals with threaded seats inside which a plurality of the aforementioned adjusting screws 14 engage, said screws being able to push with their shank against the outer surface of the metal plate of the shoe 11, preferably against reinforcing points.

In accordance with the preferred embodiment of the present invention, the heating means 26 are formed by means of a plurality of torches 29 directed against the outer surface 31 of the metal plate 11 and distributed along the aforementioned initial section 27 so as to keep in the liquid state the surface layer of lead in the vicinity of its free surface directed towards the said plate 11.

The bottom surface 9 of the annular seat 8 and advantageously also the inner surface of the side shoulders 9 are preferably knurled so as to favour engagement of the lead, during hardening, against the rotating drum 4.

The knurling has produced surprising results with regard to engagement of the molten lead against the rotating drum 4. In other words, transportation of the molten lead integrally with the rotating drum 4 is favoured by flowing of the surface layer of molten lead on the heated metal plate 11 and gripping of the solidified lead on the knurling on the bottom 9 of the annular seat 8.

The surface layer of molten lead, due to contact with the metal plate 11 which is kept by the heating means 26 at a temperature higher than the melting temperature of the lead along at least the initial section 27 of the metal plate, causes compression of the remaining lead contained inside the annular seat 8 against the surface of the bottom 9. In this way, the lead which solidifies upon contact with the surface of the bottom 9 is not raised by the latter but remains firmly gripped to the knurling on the said bottom 9.

The curvature itself of the rotating drum 4 favours gripping of the lead on the bottom 9 of the annular seat 8. These circumstances ensure optimum transportation of the lead integrally with the rotating drum 4 between the two angular positions 200, 203 where it is respectively cast inside the annular seat 8 and extracted in the form of a solidified continuous strip 30.

The machine 1 may also comprise a cooling roll 32 which is rotatably mounted on the support structure 2 in the second angular position 203 and forms a continuation of the final end of the metal plate 11.

The cooling roll 32 is driven by drive means 33 so as to rotate with its outer peripheral surface 7' in contact with the free surface of the lead contained inside the annular seat 8 so as to ensure that it is cooled to the solid state and extracted in the form of a solidified continuous strip 30.

The cooling roll 32 has an associated shaft 34 rotated about its axis of rotation Y' parallel to the axis Y of the rotating drum 4.

Advantageously, the drive means 33 consist of two gear wheels 35, 36 engaged with each other and keyed onto the shafts 3, 34, respectively, of the rotating drum 4 and the cooling roll 32.

The cooling roll 32 is kept at a temperature considerably lower than the melting temperature of the lead by means of second cooling means 23' provided and, for example, at a temperature in the range of 10° to 40° C. In this way the cooling roll cools the lead cast from the vat 10 into the annular seat 8 at the second angular position 203, ensuring solidification, prior to extraction, even of that thin surface layer of lead which was kept liquid as far as that angular position by the heating means 26 so as to favour flowing of the lead on the shoe 11.

These second cooling means 23' may for example comprise a connection to the cooling circuit of the rotating drum 4 for the supply and removal of the cooling fluid, respectively, into and from the internal chamber enclosed by the cooling roll 32 itself.

Preferably, supply and removal of the cooling fluid into/from the cooling roll 32 are performed by means of the shaft 34 of the roll 32 which is specially designed, in the same way as the shaft of the rotating drum 4, with two coaxial pipes, the innermost one of which, for example, has an inlet opening 24' connected to the cooling circuit in order to supply the cooling roll 32 with the cooling water and the outermost one of which has an outlet opening 25' which is connected to the cooling circuit in order to extract the cooling water from the cooling roll 32.

The shaft 34 of the cooling roll 34 is pivotably mounted on first ends of rockers 37 which are mounted on the sides of the cooling roll 32 and are mechanically connected to the support structure 2 by means of a central hinge 38 with a horizontal axis parallel to the axis of rotation Y' of the cooling roll 32. Thrusting means 39 are mounted on a radial bar 20 of the support structure and press against the second end of the rocker 37 so as to force the cooling roll 32 against the free surface of the lead inside the annular seat 8 and so as to keep at the same time the two gear wheels 35, 36 of the drive means 33 engaged.

The shoe 11 extends substantially from the first angular position 220, where it is fixed at the top to the vat 10 so that the closure above the annular seat 8 is uninterrupted, as far as the second angular position 203, where the strip of solidified molten lead 30 is extracted from the annular seat 8.

If it is envisaged using the cooling roll 32, the shoe 11 again extends substantially as far as the second angular position 203, where it is occupied by the cooling roll 32. This second position 203 is situated beyond the bottom end 204 of the rotating drum 4 relative to the direction of rotation of the latter indicated in the figures by an arrow F.

In accordance with the aforementioned mechanical configuration, the molten lead, before leaving the annular seat, must travel at least along a short upwards section (over a height S indicated in FIG. 4) and with its opposite surfaces (the surface on the bottom 9 of the annular seat 8 and the free surface of the liquid) being cooled by the rotating drum 4 and by the cooling roll 32.

This facilitates, during start-up of the machine 1, cooling and therefore stoppage of the molten lead casting before it leaves the annular seat 8.

The vat 10 may also be formed as a single body with the shoe 11 and extends parallel to the axis of rotation Y along the entire width L of the annular seat 8, with which it communicates preferably by means of two openings formed on the bottom thereof, a first one 100 of which is situated near an upstream wall 40 of the vat 10 and a second one 101 of which is situated near a downstream wall 41 of the vat 10.

The vat 10 is preferably kept at a controlled temperature by means of heating means, not shown in detail.

In accordance with an advantageous characteristic feature of the machine according to the invention, an ultrasound generator 18 is provided with its vibrating tip 19 (sonotrode) immersed inside the bath of the vat 10 so as to transmit to the molten lead the waves of the ultrasound generator 18.

The introduction, into the bath, of vibrations induced by ultrasounds produces cavitation. Said cavitation results in the formation, expansion and subsequent collapse of small bubbles, with the consequent generation of shock waves which cause fragmentation of the primary crystals during growth, thus producing new solidification nuclei. At the same time the acoustic flows which are generated inside the bath cause mixing and therefore homogenization of the bath.

The ultrasound treatment therefore favours the growth and the uniform distribution of the nucleation points of the crystals and limits the formation of dendritic structures, favouring the formation of globular structures with a consequent improvement in the mechanical and chemical properties of the finished grids.

The application of the ultrasounds is entirely compatible with the synergic addition—which moreover has proved to be superfluous—of refining agents.

The application of the ultrasounds favours moreover degassing of the molten lead since the quantity of gas entering into the bubbles during their expansion is greater than the quantity which emerges during compression and therefore, after several cycles, the bubbles are very enlarged so as to facilitate floating towards the surface of the bath of the vat 10 favoured by hydrodynamic forces. Most of the oxidation is concentrated on the free surface of the bath inside the vat 10 and may therefore be easily removed.

The ultrasound generator 18 comprises a power generator able to produce electric current pulses which are transmitted to a piezoelectric transducer which converts them into mechanical ultrasonic-frequency vibrations which are in turn distributed in the molten lead by means of the vibrating tip or sonotrode 19.

The latter is made of a material able to withstand the temperature of the molten lead and has a preferably pointed form. Advantageously, for better distribution of the acoustic waves, the sonotrode 19 may comprise a vibrating frame provided with a plurality of tips which are spaced from each other and distributed within the lead bath. The acoustic waves will have preferably a frequency greater than 15 KHz.

Figure 1:
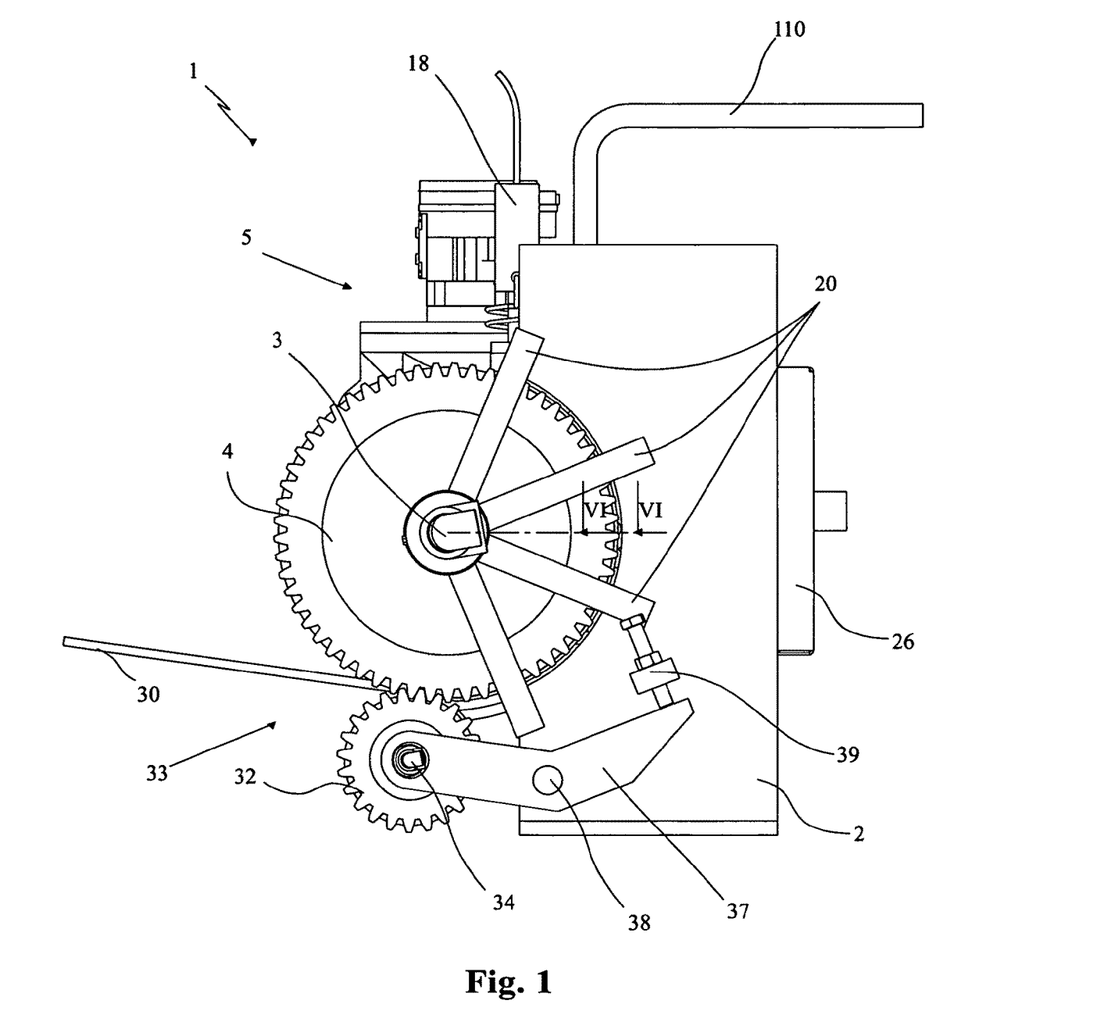
FIG. 1 shows side view of an example of a continuous casting machine for forming a lead alloy strip of large thickness, according to the present invention.
Figure 2:
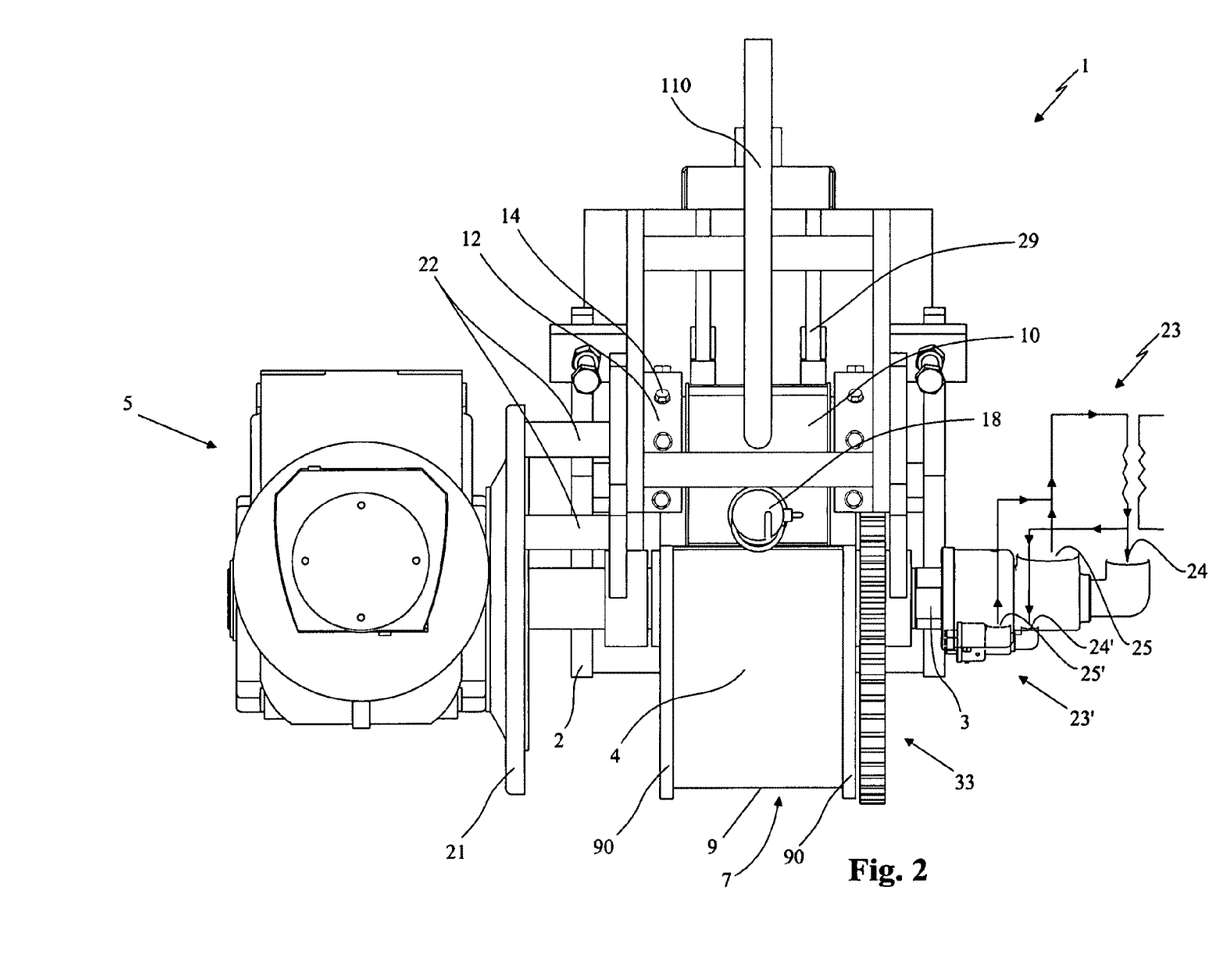
FIG. 2 shows a plan view of the machine according to FIG. 1.
Figure 3:
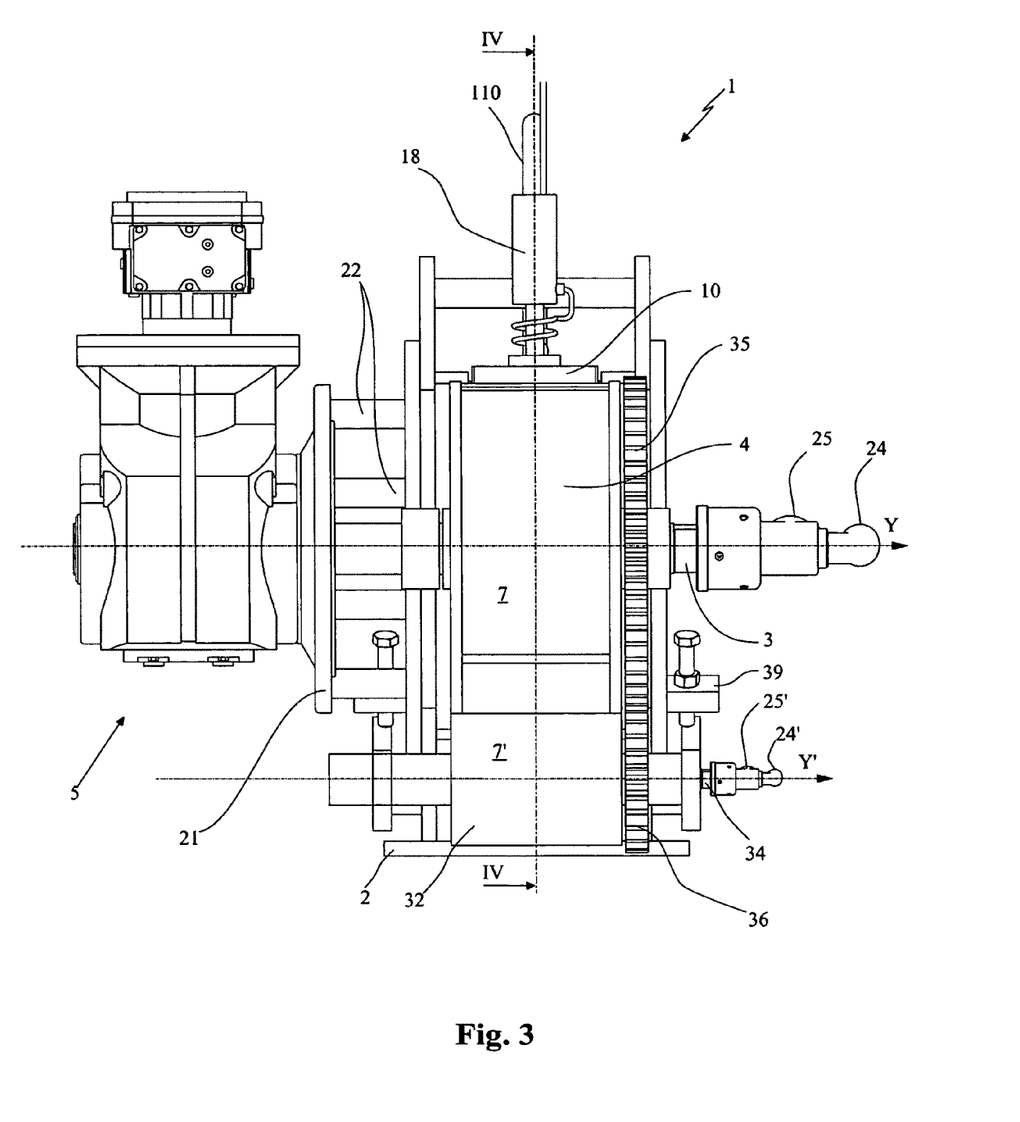
FIG. 3 shows a front view of the machine according to FIG. 1.
Figure 4:
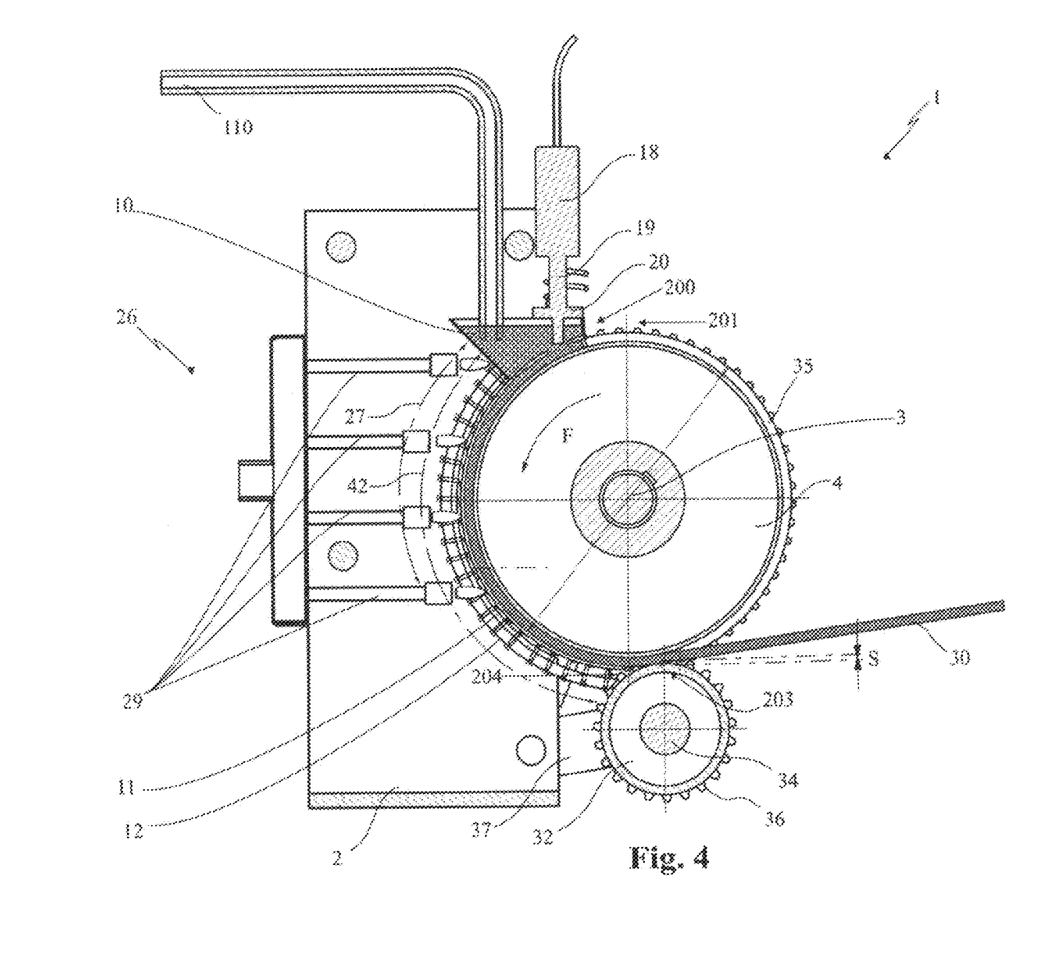
FIG. 4 shows a cross-sectional side view of the machine according to the invention along the line IV-IV of FIG. 3.
Figure 5:
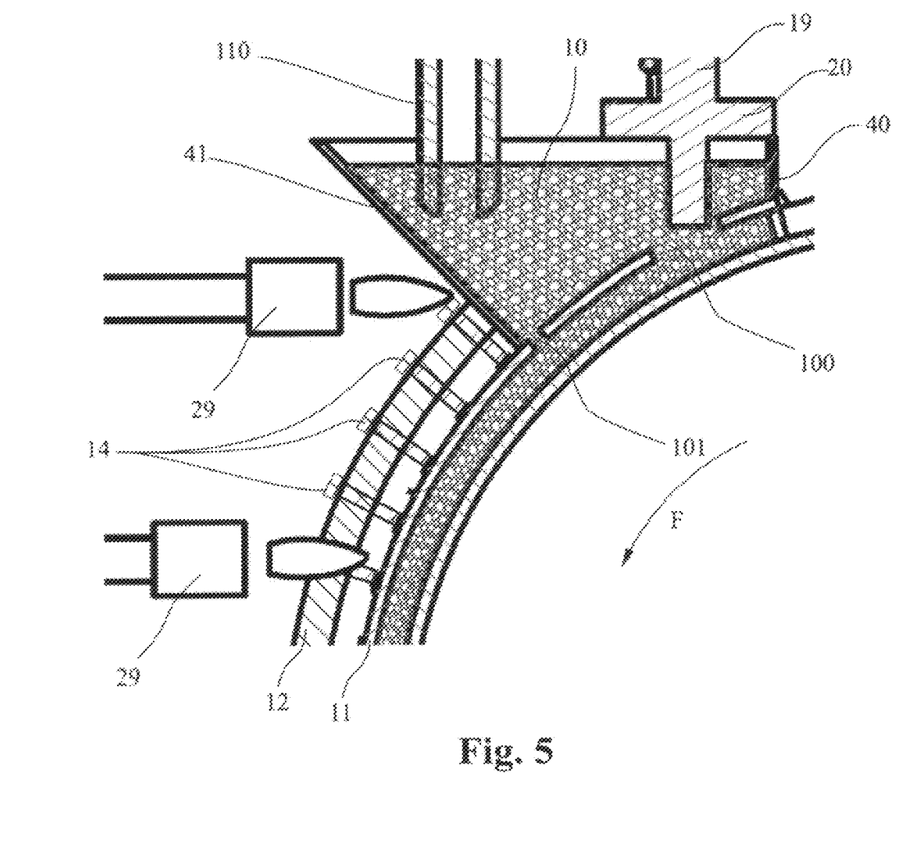
FIG. 5 shows an enlarged detail of the cross-section according to FIG. 4, relating to a vat for distributing the molten lead alloy onto a rotating drum of the machine according to the invention.

The ultrasound generator 18 is preferably mounted directly on top of the vat 10 as shown in FIG. 4, for example by means of a support flange 20.

The vat 10 containing the molten bath is preferably supplied without overpressure and therefore discharges the molten lead into the annular seat 10 of the rotating drum through the openings 100, 101 by means of simple gravity.

However, according to a different embodiment, the vat 10 may be supplied with molten lead under pressure and may have an inlet section, which is connected to a delivery pipe of the supply means so as to receive a flow of molten lead, and an outlet section, which is connected to a return pipe of the supply means in order to evacuate the excess molten lead, ensuring internally a circulation of molten lead.

The continuous strip of solidified lead 30 which is continuously formed during rotation of the rotating drum 4 following cooling of the lead inside the annular seat 8 is then removed, for example after passing along a circumferential arc subtended between the two angular positions 200, 203, preferably comprised within the range of 60° to 200°, and advantageously equal to about 180°, as shown in the accompanying figures.

The continuous strip 30 is then wound onto reels or directly conveyed away for the subsequent machining operations such as rolling, stamping or incision with expansion, so as to obtain grids for batteries.

The invention thus conceived therefore achieves the predefined objects.

Obviously, it may assume, during its practical realization, also forms and configurations different from that illustrated above, without thereby departing from the present scope of protection.

Moreover, all the details may be replaced by technically equivalent elements and the dimensions, the forms and the materials used may be of any nature according to requirements.

The invention claimed is:

1. A continuous casting machine for forming a lead alloy strip of large thickness, the continuous casting machine comprising:
   a support structure resting on the ground;
   a rotating drum mounted rotatably on said support structure, being rotated by a drive about a horizontal axis of rotation, said rotating drum comprising an outer peripheral surface having, formed therein, an annular seat defined by a bottom surface and by two side shoulders, depending on a shape of a continuous strip to be obtained and with a thickness in a range of 8-18 mm;
   a vat for containing a molten lead alloy bath, which vat receives said molten lead alloy from a supply, is directly sealingly engaged on the peripheral surface of said rotating drum in a first angular position around said rotating drum, is provided with at least one through-opening for a flow of molten lead alloy into said annular seat, and which is continuously filled during the rotation of said rotating drum;
   a cooling device, acting on said rotating drum so as to keep said rotating drum at a temperature below a melting temperature of said lead alloy, said molten lead alloy solidifying inside said annular seat before reaching a second angular position around said rotating drum, where said lead alloy is extracted from said annular seat in a form of a continuous strip of solidified lead alloy;
   a fixed shoe rigidly connected to said support structure, extending from said vat along an arc around said rotating drum, with an inner surface directed towards said arc-shaped rotating drum with a concave curvature corresponding to a convex curvature of an outer surface of said rotating drum and sealingly engaged, in a sliding relationship, on the shoulders of said annular seat; and
   a heater acting on said shoe along at least an initial section thereof which extends from said vat, said heater heating, to a temperature higher than the melting temperature of the lead alloy, a free surface of the lead alloy contained in said annular seat so as to allow flowing thereof with low friction on the inner surface of said shoe;
   wherein said vat introduces said flow of molten lead alloy into said annular seat via two openings formed in its bottom, whereby a first opening is situated near an upstream wall of said vat, and a second opening is situated near a downstream wall of said vat.

2. The continuous casting machine according to claim 1; wherein said shoe is made in the form of an arc-shaped metal plate.

3. The continuous casting machine according to claim 2, wherein said heater comprises a plurality of torches directed against an outer surface of said metal plate.

4. The continuous casting machine according to claim 1, wherein the inner surface of said shoe is smooth so as to facilitate flowing, on the free surface, of the lead alloy contained in said annular seat.

5. The continuous casting machine according to claim 1, wherein the bottom surface of said annular seat is knurled so as to facilitate its engagement with the lead alloy contained in said annular seat.

6. The continuous casting machine according to claim 1, further comprising a cooling roller rotatably mounted in said second angular position at a final end of said shoe and able to rotate about an axis of rotation parallel to the axis of rotation of said rotating drum on the free surface of said lead alloy contained in said annular seat, so as to ensure cooling thereof to a solid state before extraction.

7. The continuous casting machine according to claim 1, wherein said first angular position is situated above said second angular position and wherein said second angular position is situated beyond a bottom end of said rotating drum with respect to a direction of rotation of said rotating drum.

8. The continuous casting machine according to claim 1, wherein said first angular position is situated beyond a top of said rotating drum with respect to a direction of rotation of said rotating drum.

9. The continuous casting machine according to claim 1, wherein said shoe extends substantially between said first angular position and said second angular position so as to retain the lead alloy inside the annular seat from insertion to extraction thereof.

10. The continuous casting machine according to claim 1, wherein said vat is formed in said shoe.

11. The continuous casting machine according to claim 1, wherein said vat has an elongated form extending substantially parallel to said axis of rotation along an entire width of said annular seat.

12. The continuous casting machine according to claim 1, further comprising an ultrasound generator provided with at least one tip immersed in the molten lead alloy bath of said vat so as to transmit into it waves produced by said ultrasound generator.

13. The continuous casting machine, according to claim 12, wherein said ultrasound generator comprises a power generator able to produce electric current pulses which are transmitted to a piezoelectric transducer which in turn converts the waves into mechanical ultrasonic-frequency vibrations distributed in the molten lead alloy by means of a sonotrode.

14. The continuous casting machine according to claim 12, wherein said ultrasound generator is fixed above said vat.

* * * * *